United States Patent
Rodd-Routley

(10) Patent No.: US 11,668,603 B2
(45) Date of Patent: Jun. 6, 2023

(54) REFRACTIVE SCANNING INTERFEROMETER

(71) Applicant: Rapid Phenotyping Pty Limited, New South Wales (AU)

(72) Inventor: Selene Rodd-Routley, Blackburn (AU)

(73) Assignee: Rapid Phenotyping Pty Limited, Hamilton (AU)

( * ) Notice: Subject to any disclaimer, the term of this patent is extended or adjusted under 35 U.S.C. 154(b) by 0 days.

(21) Appl. No.: 17/339,067

(22) Filed: Jun. 4, 2021

(65) Prior Publication Data

US 2021/0293624 A1   Sep. 23, 2021

Related U.S. Application Data

(63) Continuation of application No. PCT/AU2019/051327, filed on Dec. 4, 2019.

(30) Foreign Application Priority Data

Dec. 4, 2018 (AU) ................................ 2018904607

(51) Int. Cl.
*G01J 3/453* (2006.01)
*G01J 3/14* (2006.01)
*G01J 9/02* (2006.01)

(52) U.S. Cl.
CPC .............. *G01J 3/4537* (2013.01); *G01J 3/14* (2013.01); *G01J 9/02* (2013.01); *G01J 2009/0284* (2013.01); *G01J 2009/0288* (2013.01)

(58) Field of Classification Search
CPC .............. G01J 3/453; G01J 2009/0284; G01J 2009/0288; G01J 3/14; G01J 3/45; G01J 3/4537; G01J 9/02
See application file for complete search history.

(56) References Cited

U.S. PATENT DOCUMENTS 3,482,919 A    12/1969 Barringer
4,684,255 A *  8/1987  Ford .................... G02B 27/108
                                                          356/455
(Continued)

FOREIGN PATENT DOCUMENTS

CN    104748672 B    9/2017
CN    107345787 A   11/2017
(Continued)

OTHER PUBLICATIONS

International Search Report, dated Feb. 7, 2020, by the ISA/AU, re International App No. PCT/AU2019/051327.

(Continued)

*Primary Examiner* — Violeta A Prieto

(57) ABSTRACT

Embodiments are disclosed relating to a refractively-scanning interferometer comprising an aperture that receives an incident light beam at a receiving angle, a beam splitter configured to split the incident light beam into a first beam and a second beam, a first and a second reflector arranged to reflect the first beam and second beam, respectively, towards a combining optical element, and a refractive Optical Path Difference (rOPD) assembly interposed between the beam splitter and the first reflector, wherein the rOPD Assembly refracts the first light beam an even number of times with induced phase discrepancy being a vector sum of a first phase discrepancy induced by a first refraction and a second phase discrepancy induced by a second refraction, the rOPD Assembly being configured such that the first phase discrepancy is substantially opposite in direction to the second phase discrepancy, a portion of the first and second phase discrepancies cancelling one another out to decrease magnitude of the phase discrepancy.

13 Claims, 13 Drawing Sheets

(56) References Cited

U.S. PATENT DOCUMENTS

| | | | |
|---|---|---|---|
| 5,150,172 A | 9/1992 | Brierley | |
| 6,504,614 B1* | 1/2003 | Messerschmidt | G01J 3/453 |
| | | | 356/455 |
| 6,915,044 B2 | 7/2005 | Matthews | |
| 7,161,679 B2 | 1/2007 | Messerschmidt et al. | |
| 7,388,669 B2 | 6/2008 | Abbink | |
| 7,408,713 B1 | 8/2008 | Hsieh et al. | |
| 7,489,407 B2 | 2/2009 | Hill et al. | |
| 8,441,650 B2 | 5/2013 | Kuriyama et al. | |
| 8,582,612 B2 | 11/2013 | Lundquist et al. | |
| 8,717,573 B1* | 5/2014 | Mudge | G01J 3/4532 |
| | | | 356/455 |
| 8,860,947 B2 | 10/2014 | Coffin | |
| 9,746,428 B2 | 8/2017 | Liu et al. | |
| 2002/0097402 A1 | 7/2002 | Manning | |
| 2002/0154314 A1* | 10/2002 | Copner | G02B 6/29395 |
| | | | 356/450 |
| 2003/0117629 A1* | 6/2003 | Messerschmidt | G01J 3/453 |
| | | | 356/455 |
| 2004/0061869 A1 | 4/2004 | Hill | |
| 2005/0002039 A1* | 1/2005 | Abbink | G01J 3/453 |
| | | | 356/451 |
| 2005/0270539 A1* | 12/2005 | Abbink | G01J 3/453 |
| | | | 356/451 |
| 2018/0128593 A1 | 5/2018 | Kawasaki | |
| 2021/0181100 A1* | 6/2021 | Rodd-Routley | G01J 3/45 |

FOREIGN PATENT DOCUMENTS

| | | |
|---|---|---|
| JP | S58727 A | 1/1983 |
| JP | 2000314609 A | 11/2000 |
| WO | 1999013290 A1 | 3/1999 |
| WO | 200127575 A1 | 4/2001 |
| WO | 2020113272 A1 | 6/2020 |

OTHER PUBLICATIONS

Written Opinion, dated Feb. 7, 2020, by the ISA/AU, re International App No. PCT/AU2019/051327.

Ring, et al., "Field-Compensated Michelson Spectrometers", Applied Optics, Mar. 1972, vol. 11, No. 3, pp. 507-516.

Extended European Search Report dated Aug. 5, 2022; by the EPO; re EP Application No. 19893200.6.

* cited by examiner

REFRACTIVE SCANNING INTERFEROMETER

PRIORITY DETAILS

The present application claims priority from AU 2018904607, filed in Australia on 4 Dec. 2018 and PCT/AU2019/051327, filed on 4 Dec. 2019, the entirety of the disclosures are herein incorporated by reference for all purposes.

TECHNICAL FIELD

The present invention relates generally to the field of scanning interference spectroscopy. More particularly, the present invention relates to the field of mitigating loss of information induced through dispersion and misalignment of light sources in interference spectroscopy.

BACKGROUND

Scanning interferometric spectroscopy analyses the information within a light beam by splitting the light beam into a first and second beam, inducing a phase shift between the two beams and then causing the two beams to interfere with one another, wherein a phase shift is induced by forcing the beams to traverse light paths of different lengths prior to being recombined and directed at a photodetector. By altering the difference in path length in known increments and thereby phase-shifting one beam relative to the other, the change in interference patterns induced by the two beams upon the photodetector can be monitored, allowing a user to extract information contained therein. The interference (I) between the two beams oscillates between constructive and destructive interference as the path difference ($\Delta_d$) varies, with the rate of change between constructive and destructive interference dependent upon the wavelength of the light beams.

With reference to FIG. 1, there is depicted a typical prior art scanning Michelson-type interferometric array, comprising a light source P-10 (which may provide light directly from a light source, or light via a sample), a prior art beam splitter P-12, a first reflective surface P-14 and a second reflective surface P-16. In the prior art system depicted in FIG. 1, the second reflective surface P-16 is mobile (depicted therein as being track-mounted), with the difference in path length being the difference between first path length $d_1$ and second path length $d_2$. The arrows depict the path of the light from the source, through the beam splitter, to each of the reflective surfaces, returning to the beam splitter whereupon they are recombined, and finally to exit the interferometer setup as combined output beam P-18. An alternate prior art configuration, known as the Mach-Zehnder configuration also exists, the primary difference being that a separate optical element is used to recombine the beams following splitting and reflection.

One alternate type of scanning interferometer is a refractive scanning interferometer. Rather than mechanically shifting one of the reflective elements, the interferometer comprises a refractive element positioned along the path of at least one of the split light beams. The refractive element is able to pivot about an axis perpendicular to the direction of travel of the light beam, and the light beam refracts therethrough. As the skilled person will appreciate, refraction of the light beam through the refractive element will induce an effective difference in path length between the first and second light beams that is proportional to the refractive index of the refractive element and the distance that the light beam travels through the refractive element. Pivoting of the refractive element (and therefore adjusting the angle of incidence of the light beam upon a surface of the refractive element) will alter the distance travelled by the light beam through the refractive element. This will induce an effective path difference (ad) according to the following equation 1:

$$\Delta_d = t \cdot (\sqrt{n^2 - \sin^2\theta} - \cos\theta) \quad \text{Equation 1}$$

Wherein t is the thickness of the refractive element, n is the refractive index of the refractive element, and θ is the angle of incidence. The phase shift ($\Delta_p$) in the light beam, with respect to the unrefracted light beam, is a function of the effective path difference ($\Delta_d$) and the wavelength (λ), according to the following equation 2:

$$\Delta_p = \frac{\Delta_d}{\lambda} \quad \text{Equation 2}$$

A further form of the prior art refractively scanning interferometers is depicted in Prior Art FIG. 2, depicting a scanning interferometer of the kind disclosed in U.S. Pat. No. 4,654,530. The prior art system depicted in FIG. 2 comprises a prior art light source P-10, a beam-splitter P-12, a first and second reflective element P-14, P-16 and the output beam P-18, with a pivotable refractive element P-20, which pivots about pivot point P-22. The prior art figure also depicts a number of other optical elements that are used to focus and direct the light beams. In the system shown, rather than one of the split beams being refractively shifted, both of the beams from the beam splitter are refracted. Pivoting of the refractive element increases the angle of incidence of one beam (increasing its travel distance) while decreasing the angle of incidence of the second beam (decreasing its travel distance), such that the total path difference will be a sum of the two changes to path length, such that the total path difference $\Delta_d$ equation (being equation 1) is modified into equation 3:

$$\Delta_d = |\Delta_{d,1} - \Delta_{d,2}|$$

$$\Delta_d = |(t_1 \cdot (\sqrt{n^2 - \sin^2\theta_1} - \cos\theta_1)) - (t_2 \cdot (\sqrt{n^2 - \sin^2\theta_2} - \cos\theta_2))| \quad \text{Equation 3}$$

Refractive-type scanning interferometers are often utilised in order to eliminate certain sources of error in scanning interferometry, such as error induced by perturbations in the mechanism shifting the reflective surface. By not needing to move one of the pair of reflective surfaces, their alignment can be properly maintained. However, prior art refractive interferometers, such as that disclosed in U.S. Pat. No. 4,654,530, do not overcome limitations that necessitate a tradeoff between spectral resolution and maximum angular field of view of the interferometer.

All prior art interferometric systems rely upon the light beam traversing along, or at least very close to, the central axis of the 'light path'. However, the source of the light beam (be it a light source or a sample) is typically not a point source. Light will travel from the source to the interferometer from points across the surface of the source, and will not necessarily be aligned to the central axis of the light path. As the skilled person will appreciate and with reference to FIG. 1B which depicts the central axis of the light path as a dashed line and an off-axis light beam as a solid arrow, an off-axis beam will traverse a light path of differing length that is proportional to the receiving angle θ, as well as the on-axis path length difference. Therefore, the off-axis beam will phase-shift by a different amount compared to an on-axis beam of identical frequency, and so will interfere with its partner beam in a different manner.

Beyond a critical receiving angle, the component of the phase-shift induced by the deviation of the off-axis beam (the path discrepancy) will become significant enough to cause interference that obscures, damages, degrades or otherwise renders useless the desired interference pattern. In typical prior art interferometry systems, for a desired wavenumber resolution of 4 $cm^{-1}$ the 'field of view' (being the angular range within which the deviation is not significant enough to damage the signal) is approximately 1°. The interference pattern for light from outside this 1° cone is effectively 'washed out' by the destructive interference caused by off-axis phase shift.

As the skilled person will appreciate, the field of view for the prior art interferometer can be increased by decreasing the resolution. For example, at half of the spectral resolution (which corresponds to a wavenumber resolution of 8 $cm^{-1}$), the field of view is approximately 1.41°—however, the resulting data will be less granular and, consequently, less sensitive to differences between samples being tested. Similarly, to increase the spectral resolution one must accept a tightening field of view.

There is therefore a clear need to improve spectral resolution for a given angular field of view and conversely, to widen the angular field of view allowable for a given resolution, by ameliorating the need for a trade-off between the angular field of view and spectral resolution.

The present invention seeks to fully, or at least partially, cancel the path length discrepancy that is present in prior art basic tilting glass interferometers, such as the one described in U.S. Pat. No. 4,654,530 (Dybwad, 1987). This partial or full path length discrepancy cancellation may enable the interferometer of the present invention, when used as a Fourier transform spectrometer, to be used with higher étendue light than would be possible, without compromise of the spectrometer's spectral resolution.

SUMMARY

In a first aspect, the present disclosure relates to a scanning interferometric system comprising an aperture that receives an incident light beam at a receiving angle, a beam splitter configured to split the incident light beam into a first beam and a second beam, a first and a second reflector arranged to reflect the first beam and second beam, respectively, towards a combining optical element, and a refractive Optical Path Difference (rOPD) assembly interposed between the beam splitter and the first reflector, wherein the rOPD Assembly comprises a pivotable refractor able to pivot about an axis extending substantially perpendicular to a direction of travel of the first beam in order to induce and alter a difference in path length between the first beam and the second beam, thereby phase-shifting the first beam relative to the second beam, and the combining optical element is configured to emit an output beam having an interference pattern induced by the phase-shifted first beam and the second beam interfering with one another, further wherein the interference pattern contains a phase discrepancy with a magnitude dependent upon the receiving angle of the incident light beam, the phase discrepancy being induced during refraction of the first light beam, the aperture has a critical receiving angle, such that incident light having a receiving angle greater than the critical receiving angle subsequently results in the phase discrepancy in the interference pattern of the output beam having magnitude sufficient to render a produced interference pattern illegible, invisible or otherwise undetectable, and the rOPD Assembly refracts the first light beam an even number of times with the phase discrepancy being a vector sum of a first phase discrepancy induced by a first refraction and a second phase discrepancy induced by a second refraction, the rOPD Assembly being configured such that the first phase discrepancy is substantially opposite in direction to the second phase discrepancy, a portion of the first and second phase discrepancies cancelling one another out to decrease magnitude of the phase discrepancy, thereby increasing the critical receiving angle of the system.

In an embodiment, the pivotable refractor refracts the first light beam an even number of times, and the rOPD Assembly comprises a light-rotating element arranged to rotate the first light beam by approximately 90° about the direction of travel thereof, the first light beam being rotated after a first refraction and before a second refraction. The system of claim 4 wherein the first light beam passes through the light-rotating element an even number of times, each time rotating by approximately 45°.

In an embodiment, the pivotable refractor is an X-axis pivotable refractor, the rOPD Assembly further comprising a Y-axis pivotable refractor, the first light beam refracting through each in sequence, and the Y-axis pivotable refractor has a pivot axis optically perpendicular to the pivot axis of the X-axis pivotable refractor and to the direction of travel of the first beam. In an embodiment, the X-axis pivotable refractor and y-axis pivotable refractor have pivot axes that are not physically perpendicular to one another, and the rOPD Assembly further comprises a light-rotating element between the X-axis pivotable refractor and y-axis pivotable refractor, such that, through rotating the first light beam about the direction of travel, the X-axis pivotable refractor and y-axis pivotable refractor have pivot axes that are optically perpendicular to one another.

In an embodiment, both the first beam and the second beam are refracted an even number of times by the rOPD Assembly.

In an embodiment, wherein the pivotable refractor of the rOPD Assembly comprises a dual-beam pivotable refractor that is configured to refract each of the first and second beams an even number of times, the dual-beam pivotable refractor having a pivot axis perpendicular to the direction of travel of both of the first beam and the second beam, and the light-rotating element is configured to rotate the first light beam by approximately 90° about the direction of travel thereof and the second light beam by approximately 90° about the direction of travel thereof.

In an embodiment, the pivotable refractor of the rOPD Assembly comprises a first pivotable refractor arranged to refract the first light beam and a second pivotable refractor arranged to refract the second light beam, and the light-rotating element is configured to rotate the first light beam by approximately 90° about the direction of travel thereof and the second light beam by approximately 90° about the direction of travel thereof. In an embodiment, the light-rotating element comprises a first light-rotating element arranged to rotate the first light beam by approximately 90° about the direction of travel thereof, and a second light-rotating element arranged to rotate the second light beam by approximately 900 about the direction of travel thereof.

In an embodiment, at least one of the X-axis pivotable refractor and Y-axis pivotable refractor is a dual-beam pivotable refractor configured to refract both the first beam and the second beam. In an embodiment, wherein either the X-axis pivotable refractor comprises a first X-axis pivotable refractor pivotable about the X-axis of the first beam, and a second X-axis pivotable refractor pivotable about the X-axis of the second beam, the Y-axis pivotable refractor comprises a first Y-axis pivotable refractor pivotable about the Y-axis of the first beam, and a second Y-axis pivotable refractor pivotable about the Y-axis of the second beam, or the X-axis pivotable refractor comprises a first and second X-axis pivotable refractor, and the Y-axis pivotable refractor comprises a first and second Y-axis pivotable refractor.

In an embodiment, the combining optical element is the beam splitter, such that the system is a Michelson-type interferometric system. In an alternate embodiment, the combining optical element is a second beam splitter, such that the system is a Mach-Zehnder-type interferometric system.

In an embodiment, an interferometer comprising at least a first and second rOPD assembly interposing between a beamsplitter and a first and second reflector, the rOPD assemblies being configured for sequential path length modulation of a first and second light beam and being concatenated such that their respective pathlength modulation effect is mutually reinforced by the concatenation, in that a total path length modulation is a sum of the path length modulation of the first rOPD assembly and the second rOPD assembly, wherein the second rOPD assembly is further configured so that its associated pathlength discrepancy function at least partially cancels an associated pathlength discrepancy function of the first rOPD assembly.

In an embodiment, the present invention may comprise an interferometer comprising two or more rOPD assemblies interposing between the beamsplitter and retro reflecting mirrors and concatenated such that a pathlength modulation effect of both is mutually reinforced by the concatenation, and a beam redistribution element between the concatenated elements which bijectively reassigns directions within the beam, such that directions which undergo a positive pathlength discrepancy in the first rOPD assembly are mapped to directions which undergo a negative pathlength discrepancy in the second rOPD assembly, thereby providing at least a partial cancellation of an overall pathlength discrepancy function of the system.

In an embodiment, the second rOPD assembly is further configured so that its associated pathlength discrepancy function at least partially cancels an associated pathlength discrepancy function of the first rOPD assembly, and cancellation of the path length discrepancy function of the system is provided through a combination of cancellation by the beam redistribution element and cancellation by the configuration of the second rOPD assembly.

DESCRIPTION OF FIGURES

Embodiments of the present invention will now be described in relation to figures, wherein.

DEFINITIONS

Figure 1:
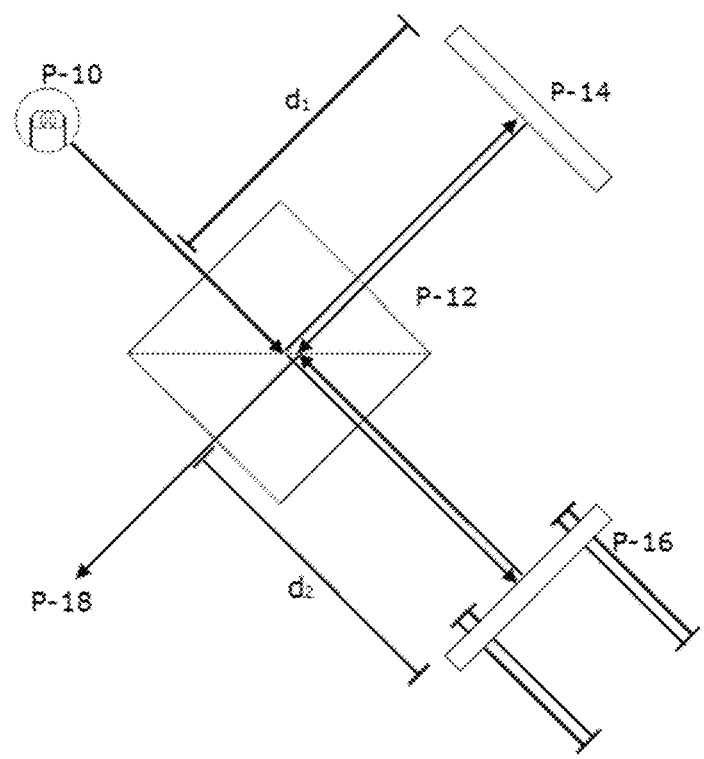
FIGS. 1 & 2 depict prior art interferometry systems.
Figure 2:
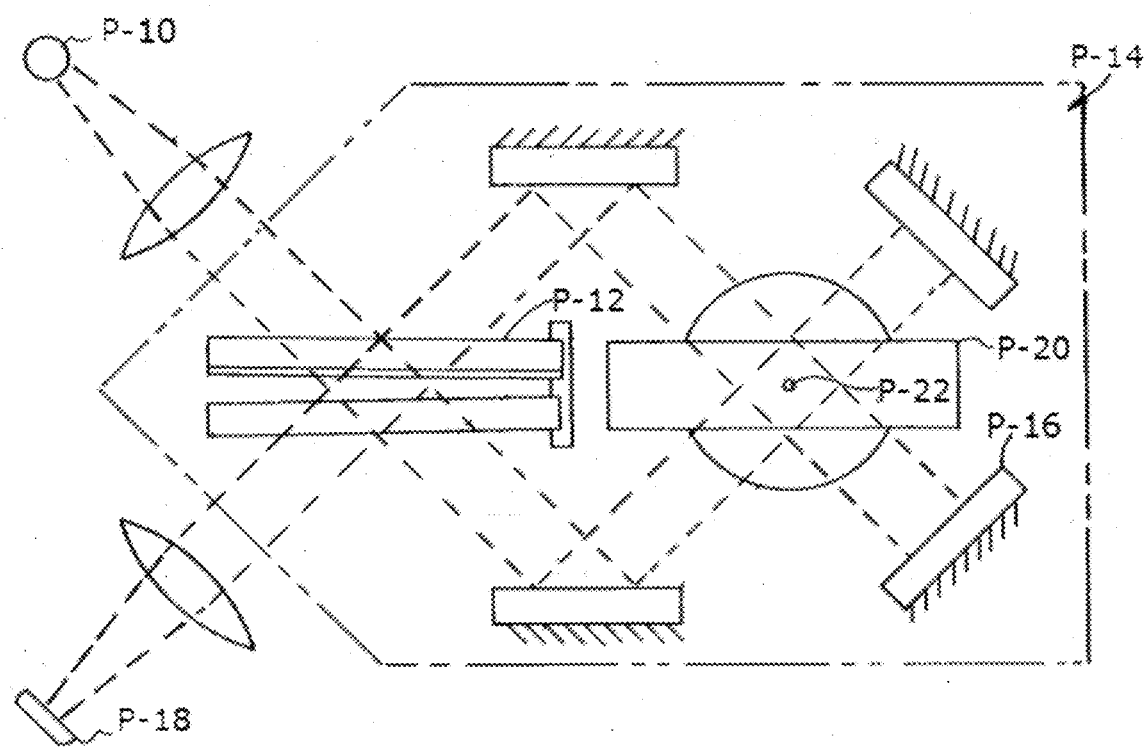

Wavenumber: As used herein, the term 'wavenumber' refers to the number of wavelengths per unit distance, and is equal to the spatial frequency for an associated light beam.

Wavenumber Resolution: As used herein, the term 'wavenumber resolution' is used to refer to the smallest change in a property that can be detected by the interferometer in question, wherein the property is able to be measured in, recorded as, converted to, or is otherwise a function of, the wavenumber.

Path length discrepancy/Phase discrepancy: As used herein, the term 'path length discrepancy' is used to refer to the difference between actual path length and measured path length for a light beam that is off-axis and is a function of the angle between the off-axis light beam and the axis (the receiving angle). Phase discrepancy is the phase shift induced in an off-axis light beam by the path length discrepancy, and so is a function of the receiving angle and the wavelength of the light beam.

X/Y/Z Axis: By convention and as used herein, the Z-axis for a light beam is an axis extending in the direction of travel of the 'ideal' beam. The X-axis and Y-axis, as used in various equations and elsewhere, are axes that are orthogonal both to the Z-axis and to one another. As used herein, the X- Y- and Z-axis are defined relative to the particular light beam—and the term 'light path' is used to refer to light travelling exactly along the relevant Z axis. In various figures, the axes are depicted as dashed lines with a particular subscript notation, wherein the value of x indicates whether it is the incident light axis (subscript symbol i), the axis of the first beam (subscript symbol 1), the axis of the second light beam (subscript symbol 2) or the axis of the output beam (subscript symbol O).

Light path: As used herein, the term 'light path' is used to refer to the path taken by a light beam that extends along, or at an angle to, a particular Z-axis. Each light path will typically be discussed in relation to its relevant Z axis.

Receiving Angle: As used herein, the term 'receiving angle' is used to refer to the angle between a ray of incident light falling upon an entry aperture into the interferometer and the incident axis $Z_i$, being an axis extending normal to the aperture. Light traversing perfectly along the axis will not suffer a path length discrepancy.

Critical Receiving Angle: As used herein, the term 'critical receiving angle' refers to a receiving angle beyond which an induced phase discrepancy occludes, obscures or renders a produced interference pattern illegible, invisible or otherwise undetectable. This term may be equivalent to a particular interferometer's maximum "field of view".

DETAILED DESCRIPTION

For the purposes of promoting an understanding of the principles of the present inventions, reference will now be made to the embodiments, or examples, illustrated in the drawings and specific language will be used to describe the same. It will nevertheless be understood that no limitation of the scope of the invention is thereby intended. Any alterations and further modifications in the described embodiments, and any further applications of the principles of the inventions as described herein are contemplated as would normally occur to one skilled in the art to which the invention relates.

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

Embodiments of the system described herein will generally be described in terms of a Michelson-type interferometer, but the skilled person will appreciate that at least some of the embodiments described herein are equally applicable to a Mach-Zehnder-type interferometer and therefore such embodiments are not beyond the scope of the present invention.

Figure 3:
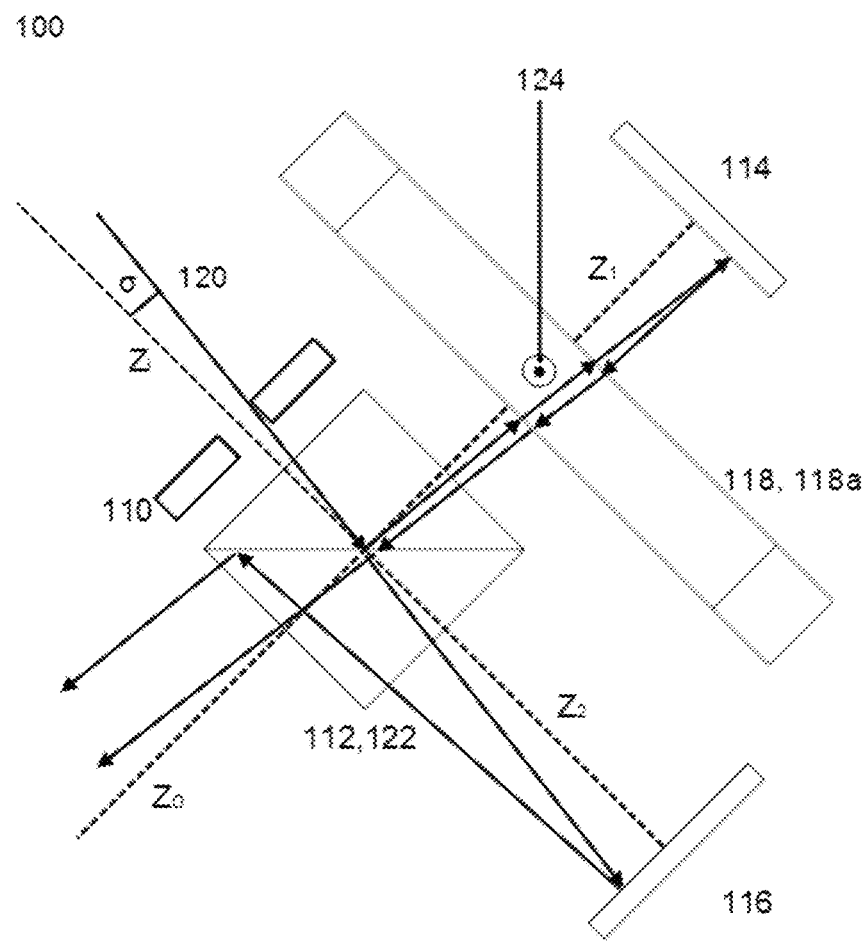
FIG. 3 depicts an embodiment of the present invention.

In a broad first aspect and with reference to FIG. 3, the present invention relates to a refractive scanning interferometric system 100 comprising an aperture 110 to receive incident light, a beam splitter 112, a first and second reflector 114, 116, and a refractive Optical Path Difference (rOPD) assembly 118 positioned between the beam splitter 112 and the first reflector 114. The dashed lines depict the central axis for each 'light path', while solid arrows depict light beams. Incident light 120 enters through the aperture 110 at a receiving angle σ σ (being an angle away from normal relative to the aperture 110), is split into a first beam and a second beam by the beam splitter 112, that are subsequently directed towards the first and second reflector 114, 116, respectively. In at least one embodiment, the first light beam passes through the rOPD Assembly 118. The first and second light beams are reflected towards a combining optical element 122. In an embodiment of the invention that comprises a Michelson-type configuration (which is the embodiment depicted in FIG. 3), the combining optical element 122 is the beam splitter 112, which 'recombines' the first and second beams to produce an output beam. In an alternate embodiment of the invention (not shown) that comprises a Mach-Zehnder-type configuration, the combining optical element 122 is a further optical element, such as a further beam splitter, that recombines the first and second beams following reflection to produce an output beam.

In an embodiment of the present invention, the rOPD Assembly 118 comprises at least one refractor 118a positioned along the path $Z_1$ of the first light beam that is able to pivot about an axis 124 (graphically represented by the dot enclosed within a circle as an axis extending through the image) perpendicular to the direction of travel of the first light beam, the pivotable refractor 118a pivoting in order to induce and alter a path difference between the first light beam and the second light beam. The effective path length difference induces a shift in phase in the first light beam relative to the second light beam, such that once the first and second beams are recombined within the combining optical element 122, the output beam comprises an interference pattern that is dependent upon the phase shift.

In an embodiment, the aperture 110 receives incident light 120 from a source (which may be light from a sample or from a light source). The incident light 120 traverses an incident light path that has an incident axis $Z_i$ extending outwardly from the aperture 110. As the skilled person will appreciate, unless the source is a point source perfectly aligned with the incident axis $Z_i$, then at least a portion of the incident light will enter the aperture 110 at a receiving angle σ σ that is off of the incident axis. The skilled person will further appreciate that if the incident light comprises an off-axis portion, then the first and second light beams will necessarily each comprise an off-axis portion as well, their respective off-axis portions being at an angle away from an axis extending from the beam splitter 112 to the first and second reflective elements, respectively (depicted in FIG. 3 as $Z_1$ and $Z_2$). The off-axis portions of the light, being light having a receiving angle σ greater than 0°, will result in a phase discrepancy within the interference pattern having a magnitude dependent upon the receiving angle σ.

In an embodiment and with further reference to FIG. 3, the rOPD Assembly 118 is arranged or otherwise configured such that the first light beam is refracted twice. A first refraction of the first light beam induces a first phase discrepancy ($\Omega_{P1}$) therein, while a second refraction of the first light beam induces a second phase discrepancy ($\Omega_{P2}$), with the phase discrepancy present within the interference pattern of the output beam $\Omega_P$ being a vector sum of the first and second phase discrepancies ($\Omega_{P1}+\Omega_{P2}$). In an embodiment of the present invention, the rOPD Assembly 118 is further configured such that the first and second phase discrepancies are substantially opposite in direction to one another, such that a portion of the phase discrepancies cancel one another out, thereby reducing the total induced phase discrepancy $\Omega_P$.

Basic Theory of Phase Discrepancy Reduction

Without limiting the scope of the invention through theory, it is considered that manipulating the phase discrepancy within the output beam to be a vector sum of a first and second phase discrepancy, wherein the first and second phase discrepancies have opposing vector directions, may enable light of an increased receiving angle σ to be received by the aperture 110 and processed by the system of the present invention, thereby increasing the critical receiving angle σ of the aperture 110. As the skilled person may appreciate, the critical receiving angle σ of the aperture 110 is linked to the magnitude of the total phase discrepancy within the output beam. In at least one embodiment of the present invention, by configuring the rOPD Assembly 118 to induce a first and second phase discrepancy with opposing directions, the output beam phase discrepancy may be reduced through vector addition of the first and second phase discrepancies. As a result, the magnitude of the phase discrepancy within the output beam, for a given receiving angle σ, is reduced—and consequentially, phase discrepancy of sufficient magnitude to occlude, damage or otherwise render the interference pattern undetectable may therefore occur at a greater receiving angle σ.

In mathematical terms, a conventional interferometer inducing a path difference by moving a reflective element will suffer phase discrepancy according to the following equation 4:

$$\Omega_P = \Delta_d(\gamma_x^2 + \gamma_y^2) \qquad \text{Equation 4}$$

Wherein $\Omega_P$ is the phase discrepancy, $\Delta_d$ is the induced path difference, and $\gamma_x$ and $\gamma_y$ are the direction cosines of the receiving angle σ of the incident light—in other words, the components of the receiving angle σ extending along the X and Y axes, respectively. As the skilled person may appreciate, the values for $\gamma_x$ and $\gamma_y$ may be positive or negative—but regardless of their 'sign', the total phase discrepancy $\Omega_P$ will always be positive.

Figure 4:
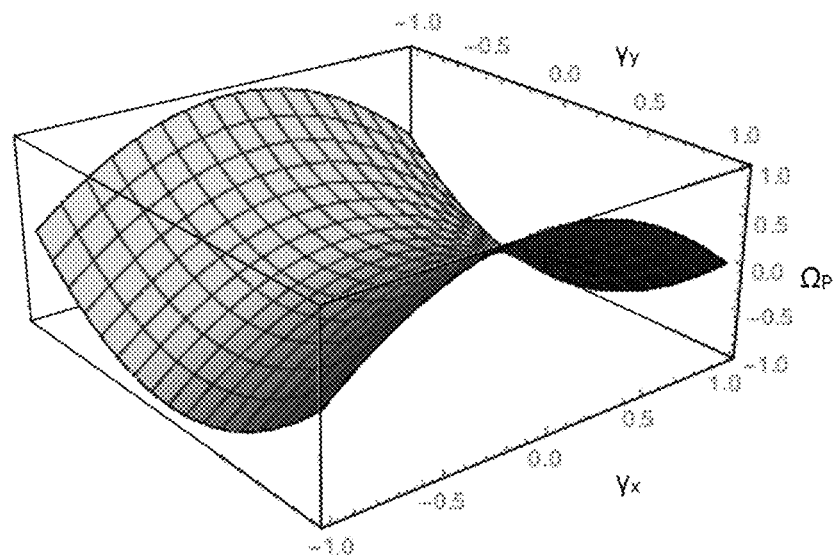
FIG. 4 graphically depicts an equation determining phase discrepancy for the present invention.

In comparison, the phase discrepancy of an embodiment of the interferometer of the present invention follows according to equation 5:

$$\Omega_P = \Delta d(a^2\gamma_x^2 - b^2\gamma_y^2)$$ Equation 5

Wherein a & b are coefficients dependent upon the refractive properties of the pivotable refractor 118a, and $\Delta_d$ is the path difference induced by pivoting of the pivotable refractor 118a as per Equation 4. Unlike a 'conventional' interferometer setup, the phase discrepancy for embodiments of the present invention can be both positive and negative in value depending upon the x- and y-component of the receiving angle σ. FIG. 4 provides a visual depiction of Equation 4 at a set path difference value. As the skilled person may appreciate, Equation 4 has odd symmetry.

In an embodiment of the present invention, the rOPD Assembly 118 is configured such that a first path difference is induced through refraction about the X-axis, and a second path difference is induced through refraction about the Y-axis (or vice-versa). In mathematical terms and without limiting the scope of the invention through theory, it is considered that configuring the rOPD Assembly 118 to conduct a first and second refraction along separate, orthogonal axes will result in a swap of the roles of the X- and Y-direction cosines due to the odd symmetry of equation 4. In effect, Equation 5 may be considered to become equation 6, below:

$$\Omega_P = \Omega_{Px} + \Omega_{Py}$$

$$\Omega_{Px} = \Delta_{dx}(a^2\gamma_x^2 - b^2\gamma_y^2) \ \& \ \Omega_{Py} = \Delta_{dy}(a^2\gamma_y^2 - b^2\gamma_x^2)$$

$$\Omega_P = \Delta_{dx}a^2\gamma_x^2 + \Delta_{dy}a^2\gamma_y^2 - \Delta_{dx}b^2\gamma_y^2 - \Delta_{dy}b^2\gamma_x^2$$ Equation 6

Wherein $\Delta_{dx}$ and $\Omega_{Px}$ refer to the path difference and phase discrepancy from the first refraction, and $\Delta_{dy}$ and $\Omega_{Py}$ refer to the path difference and phase discrepancy from the second refraction. Through manipulation of the path difference of the first and second refractions as well as control of coefficients a and b, the total phase discrepancy $\Omega_P$ can be reduced.

Advantages

As previously discussed and with reference to Equations 5 & 6, there are three elements that are affected by Phase Discrepancy. These are the spectral resolution of an interferometer, the maximum path difference, and the maximum field of view. As previously discussed, an increased spectral resolution is desired when an embodiment of the interferometer of the present invention is employed in a spectrometer or similar analytical apparatus. Improved spectral resolution enables increased granularity of data, an increase in the maximum path difference enables an interferometer to obtain a greater range of signals, and increasing the maximum field of view enables incident light to be collected from a wider angle.

At a particular spectral resolution, and from Equation 5 & 6, one may appreciate that a maximum phase discrepancy (i.e. the point when phase discrepancy is sufficient to 'wash out' a signal) may be determined by either fixing the path length difference $\Delta_d$, or the direction cosines $\gamma_x$ and $\gamma_y$, with the remaining variable being the independent variable.

Prior art interferometers required that these three elements were traded off against one another—an improved spectral resolution dictated that the prior art interferometer utilised either or both of a decreased field of view or decreased maximum path difference, and vice-versa. However, through operation of Equation 6, an embodiment of the present invention enables this trade-off to be circumvented (or at least alleviated).

Advantage 1—Increased Maximum Path Difference

In mathematical terms, if an embodiment of an interferometer has a particular field of view (and thus has defined maximum values for the direction cosines $\gamma_{x,max}$ and $\gamma_{y,max}$), the path difference $\Delta_d$ may be considered to be the independent variable in Equations 5 and 6.

In prior art interferometers, increasing the path difference required either reducing the spectral resolution or reducing the field of view—the maximum values of the direction cosines $\gamma_{x,max}$ and $\gamma_{y,max}$ were dependent upon the maximum path difference, as all three elements ($\Delta_{d,max}$, $\gamma_{x,max}$ and $\gamma_{y,max}$) had to be such that $\delta_P$ was insufficient to destroy, wash out or otherwise damage a desired interference signal.

However, through an embodiment of the present invention and providing at least partial cancellation of induced phase discrepancy as per Equation 6, it is considered that certain embodiments of the present invention, in enabling a reduction in the magnitude of the phase discrepancy, may enable an interferometer to utilise an increased maximum path length difference for a particular field of view without requiring a trade-off in either spectral resolution or the field of view. Through Equation 6, the maximum acceptable level of phase discrepancy $\Omega_{P,max}$ and set maximum values of $\gamma_{x,max}$ and $\gamma_{y,max}$ (corresponding to the field of view of the particular embodiment of the invention) will occur at an increased $\Delta_{d,max}$.

Advantage 2—Increased Field of View

Similarly to the above, if a maximum path length difference is set, then the direction cosines become the independent variables. In other words, for a particular desired maximum path length difference $\Delta_{d,max}$, greater values of the direction cosines $\gamma_{x,max}$ and $\gamma_{y,max}$ may be accepted by Equation 6 without resulting in a phase discrepancy $\Omega_P$ sufficient to destroy, wash out or otherwise damage a desired interference signal. In other words, embodiments of the present invention may enable for an increased field of view (corresponding to increased values of $\gamma_{x,max}$ and $\gamma_{y,max}$) without requiring a trade-off in decreasing the maximum path difference $\Delta_{d,max}$ or the spectral resolution.

The skilled person will appreciate that the above advantages may apply to all or most of the embodiments disclosed herein.

There are two primary means by which the rOPD Assembly 118 may be configured to enable refraction about the X-axis and about the Y-axis.

Optical Rotation

As the skilled person may appreciate, by optically rotating the first light beam about the Z-axis, the 'actual' or physical direction of the first light beam's X- and Y-axis may be altered.

In an embodiment of the present invention, the rOPD Assembly 118 comprises a single pivotable refractor 118a that pivots about a pivot axis that is perpendicular to the Z-axis of the first light beam, $Z_1$. In such an embodiment, the first beam may pass through the pivotable refractor 118a twice—once upon leaving the beam splitter 112, and again following reflection from the first reflective element. In such an embodiment, the rOPD Assembly 118 may further comprise a light-rotating element 118b being an optical element that rotates a light beam about the Z-axis, the light-rotating element 118b being positioned between the pivotable refractor 118a of the rOPD Assembly 118 and the first reflective element. The light-rotating element 118b may be arranged to induce an approximately 90° rotation in the first light beam. Prior to passing through the light-rotating element 118b, the pivot axis may correspond to the X-axis of the first light beam, and following optical rotation, the pivot axis may correspond to the Y-axis of the first light beam (or vice-versa) thereby inducing a swap of the roles of the X- and Y-direction cosines with respect to equation 5, enabling transformation thereof into equation 6.

As the skilled person will appreciate, the pivot angle does not change in magnitude between the first and second refractions, and therefore the path difference of the first and second refractions are equal in magnitude. As a result, equation 6 becomes equation 7, below:

$$|\Delta_{dx}| = |\Delta_{dy}| = \frac{\Delta_d}{2}$$ Equation 7

$$\Omega_P = \frac{\Delta_d}{2}\left[a^2(\gamma_x^2 + \gamma_y^2) - b^2(\gamma_y^2 + \gamma_x^2)\right]$$

$$\Omega_P = \frac{\Delta_d}{2}\left[(a^2 - b^2)(\gamma_x^2 + \gamma_y^2)\right]$$

In one embodiment the first light beam may pass through the light-rotating element 118b twice—once during travel to the first reflective element, and a second time following reflection. In such an embodiment the light-rotating element 118b may be configured to rotate the first light beam by approximately 45° each time. In an alternate embodiment wherein the first light beam passes through the light-rotating element 118b once, the light-rotating element 118b may be configured to rotate the first light beam by approximately 90°.

Multiple Pivotable Refractors in Series

Figure 6:
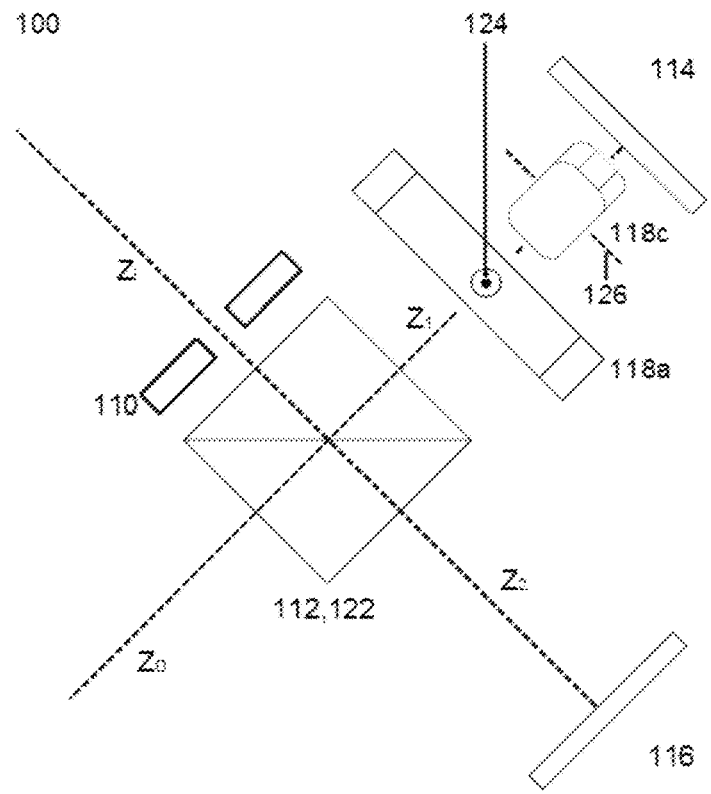
FIGS. 6 & 7 depict alternate embodiments of the present invention utilising multiple refractions in series.

In an alternate embodiment of the present invention and with reference to FIG. 6, the rOPD Assembly 118 may comprise an X-axis pivotable refractor 118a and Y-axis pivotable refractor 118a, each pivoting about axes 124, 126 that are optically perpendicular to the Z-axis ($Z_1$) and to one another, with the first light beam passing through the X-axis and Y-axis pivotable refractors 118a,118c in sequence. In at least one embodiment, the Y-axis pivotable refractor 118a pivots at an angle that is, with reference to the X- and Y-axes of the first light beam, approximately 90° with respect to the X-axis pivotable refractor 118a, thereby enabling a swap of the roles of the X- and Y-direction cosines due to the odd symmetry of equation 5 or 6. The X-axis pivotable refractor 118a performs a first refraction upon the first light beam, while the Y-axis pivotable refractor 118a performs a second refraction upon the first light beam. The total path difference $\Delta_d$ is the sum of the path difference induced by each pivotable refractor 118a, as per equation 8:

$$\Delta_d = (t_x \cdot (\sqrt{n^2 - \sin^2\theta_x} - \cos\theta_x)) + (t_y \cdot (\sqrt{n^2 - \sin^2\theta_y} - \cos\theta_y))$$ Equation 8

Figure 7:
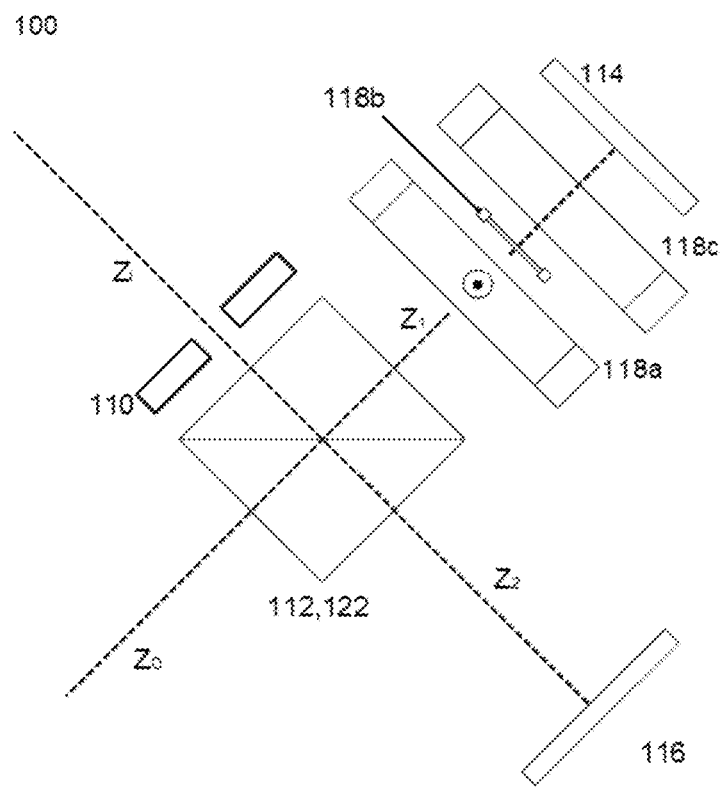

In a further embodiment as depicted in FIG. 7, the pivot axes of the X-axis pivotable refractor 118a and Y-axis pivotable refractor 118c are not physically perpendicular to one another. In such an embodiment the rOPD Assembly 118 may further comprise a light-rotating element 118b between the X-axis pivotable refractor 118a and Y-axis pivotable refractor 118c to induce a rotation in the first light beam about the Z-axis (being the direction of travel of the first light beam). This may enable the pivot axes of the X-axis pivotable refractor 118a and Y-axis pivotable refractor 118c to be approximately optically perpendicular to one another, even though they are not physically perpendicular.

In a further embodiment, the pivot angle of the X-axis pivot component and the pivot angle of the Y-axis pivot component may be approximately equal, such that the path difference of the first and second refractions are approximately equal. In such an embodiment, the phase discrepancy will be as per equation 6.

In a further embodiment stemming from either an embodiment utilising optical rotation or from an embodiment utilising multiple pivotable refractor, the rOPD Assembly 118 may be further configured such that coefficients a and b are substantially similar in magnitude in order to reduce the total phase discrepancy. As the magnitude of phase discrepancy at a particular receiving angle σ is dependent upon coefficients a and b (and, conversely, so is the critical receiving angle σ), configuration of the rOPD Assembly 118 to reduce the difference in magnitude between coefficients a and b may enable the critical receiving angle σ to be increased for a particular maximum path difference (thereby enabling an increased field of view)—or conversely, for a particular maximum field of view, the maximum path difference may be increased.

Refraction of Both First and Second Light Beams

In certain scenarios, it may be beneficial to induce a path length difference through refraction of both the first light beam and the second light beam. This may be achieved through refracting the first and second light beams through refracting elements having differing angles of incidence, such that the total path difference $\Delta_d$ equation (being equation 1) is modified into equation 9, a replica of equation 3:

$$\Delta_d = |\Delta_{d,1} - \Delta_{d,2}|$$

$$\Delta_d = |(t_1 \cdot (\sqrt{n^2 - \sin^2\theta_1} - \cos\theta_1)) - (t_2 \cdot (\sqrt{n^2 - \sin^2\theta_2} - \cos\theta_2))|$$ Equation 9

Wherein $\Delta_{d,1}$ corresponds to the path length difference induced in the first beam and $\Delta_{d,2}$ corresponds to the path length difference induced in the second beam.

Figure 8:
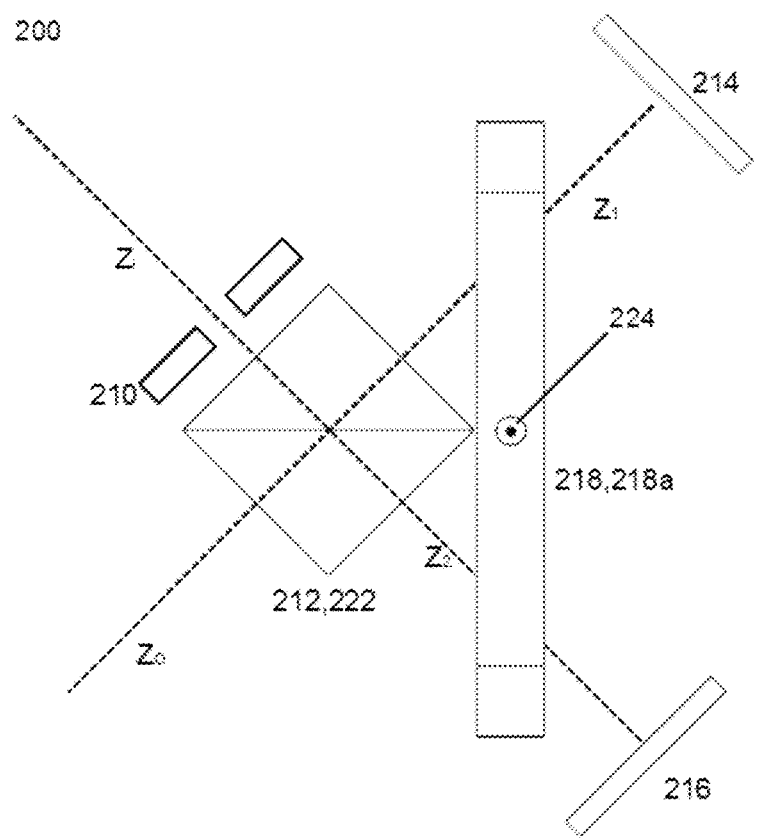
FIG. 8 depicts an embodiment of the present invention applied to both beams.

In one further embodiment and with reference to FIG. 8, the system may comprise an aperture 210, a beam splitter 212, first and second reflectors 214,216 and an rOPD Assembly 218. As FIG. 8 depicts an embodiment of a Michelson-type interferometer, the beam splitter 212 is also a recombining element 222.

Figure 9:
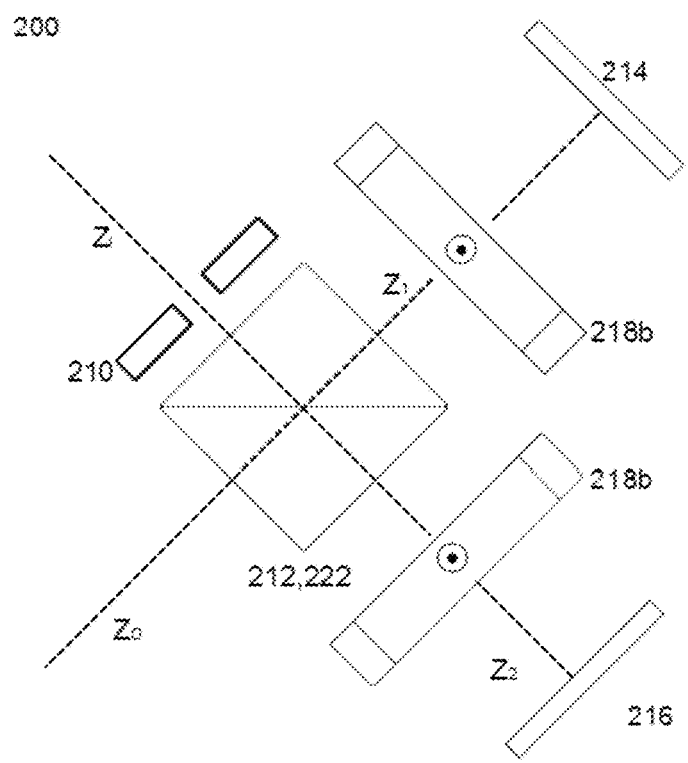
FIG. 9 depicts an alternate embodiment of FIG. 8.

As depicted in FIG. 8, the rOPD Assembly 218 may comprise a pivotable refractor that is arranged to refract both the first light beam and the second light beam, referred to herein as a dual-beam pivotable refractor 218a and having a pivot axis 224 that is perpendicular to the direction of travel of both of the first beam and the second beam. In an alternate further embodiment depicted in FIG. 9, the pivotable refractor may comprise a first pivotable refractor 218a arranged to refract the first light beam and a second pivotable refractor 218a arranged to refract the second light beam.

Optical Rotation of Multiple Beams

In an embodiment, the system may apply principles of optical rotation to both of the first and second beams. Principles applied to prior-discussed embodiments of the invention utilising optical rotation, in particular equation 7, similarly apply to at least the present embodiment.

Figure 5:
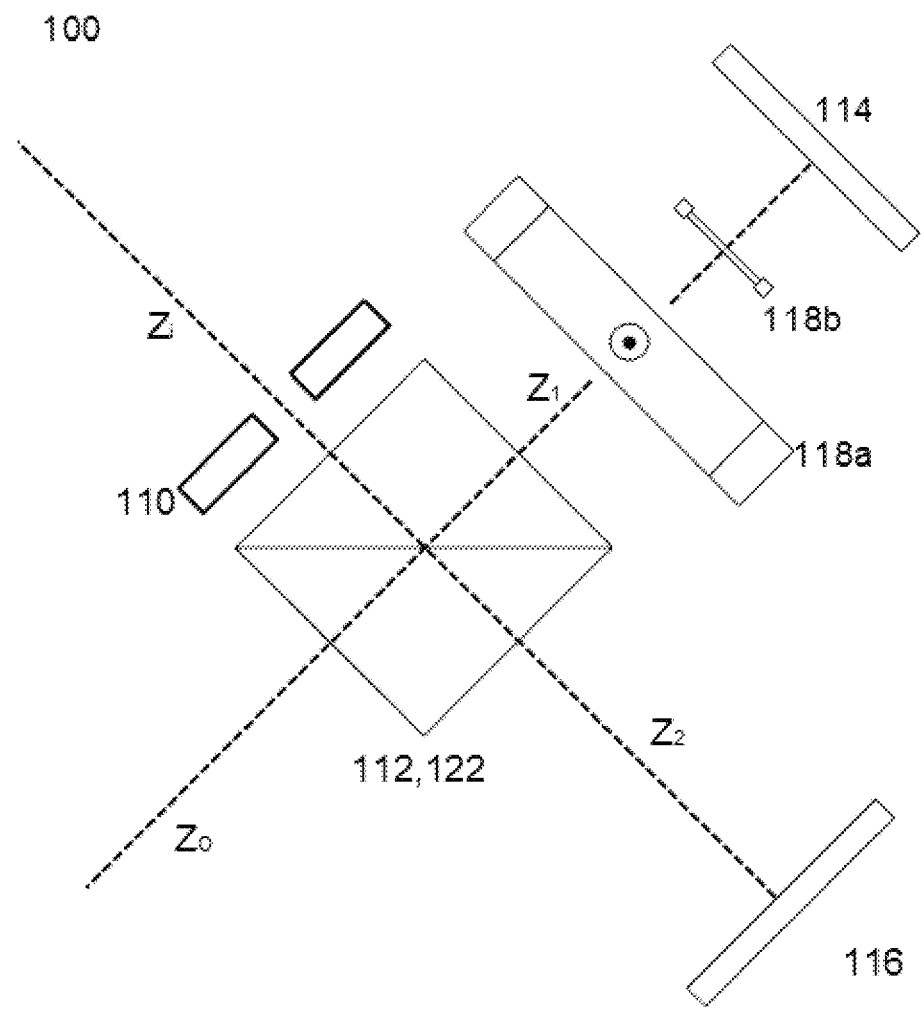
FIG. 5 depicts an embodiment of the present invention utilising optical rotation.
Figure 10:
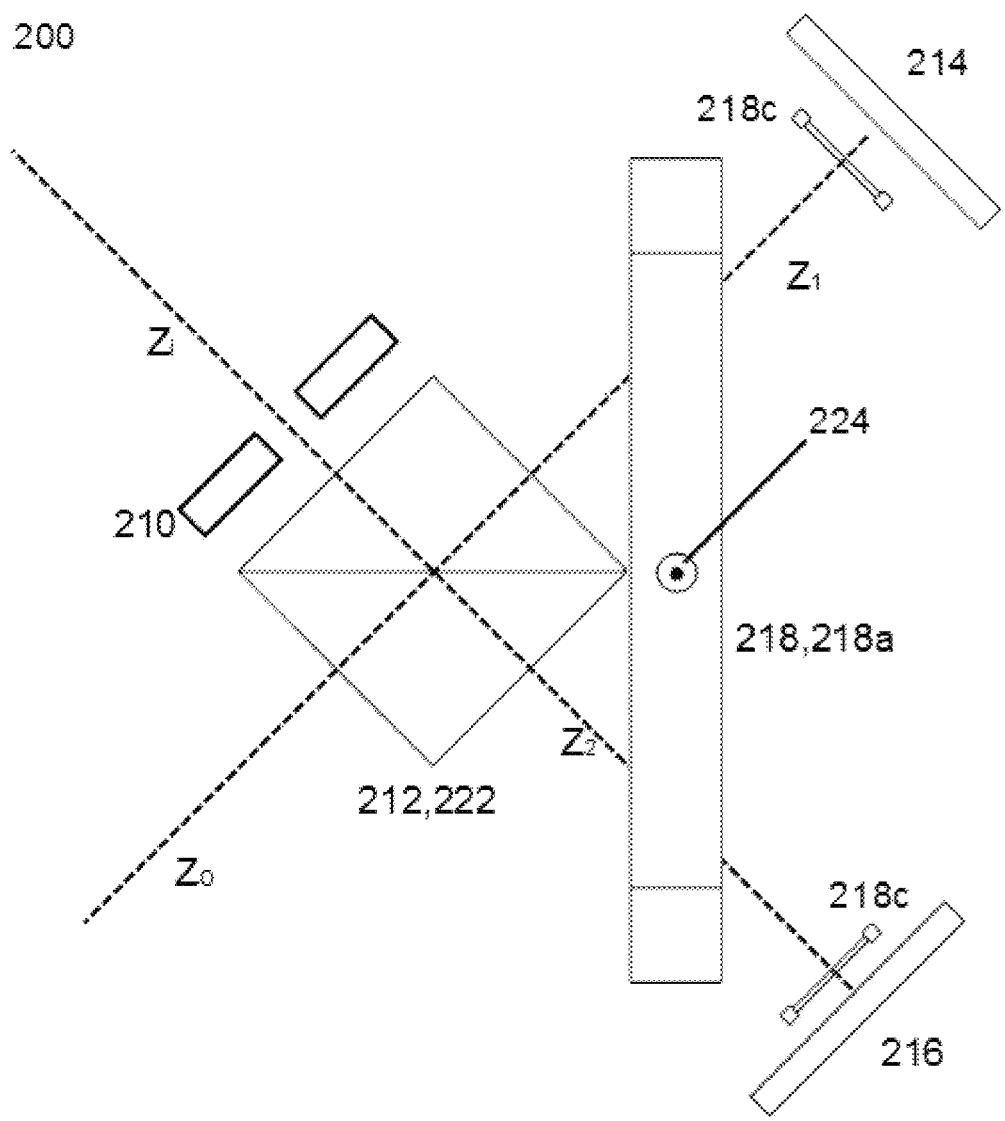
FIG. 10 depicts a dual-beam embodiment of the embodiment depicted in FIG. 5.

In an embodiment, The rOPD Assembly 218 may further comprise a light-rotating element 218c arranged to rotate the first light beam by approximately 90° about the direction of travel thereof, and the second light beam by approximately 90° about the direction of travel thereof, with each light-rotating element 218c being arranged to rotate the respective light beams between the first and second refractions thereof. In one further embodiment (not depicted), the light-rotating element 218c may be a dual-beam light-rotating element 218c. In an alternate further embodiment and as depicted in FIG. 10 (which is a dual-beam embodiment of the embodiment depicted in FIG. 5), the light-rotating element 218c may comprise a first light-rotating element 218c arranged to rotate the first light beam by approximately 90° about the direction of travel thereof, and a second light-rotating element 218c arranged to rotate the second light beam by approximately 90° about the direction of travel thereof. The skilled person will appreciate that either form of light-rotating element 218c may be used in conjunction with either a dual-beam pivotable refractor 218a or first and second pivotable refractors 218b.

Multiple Pivotable Refractors in Series for Both Beams

In an alternate embodiment, the system 200 may apply use of multiple sequential refractive elements to both the first beam and the second beam, such that each beam is refracted by an X-axis pivotable refractor and Y-axis pivotable refractor. Principles applied to prior-discussed embodiments of the invention utilising multiple pivotable refractors in series, in particular equation 8, similarly apply to at least the present embodiment.

Figure 11:
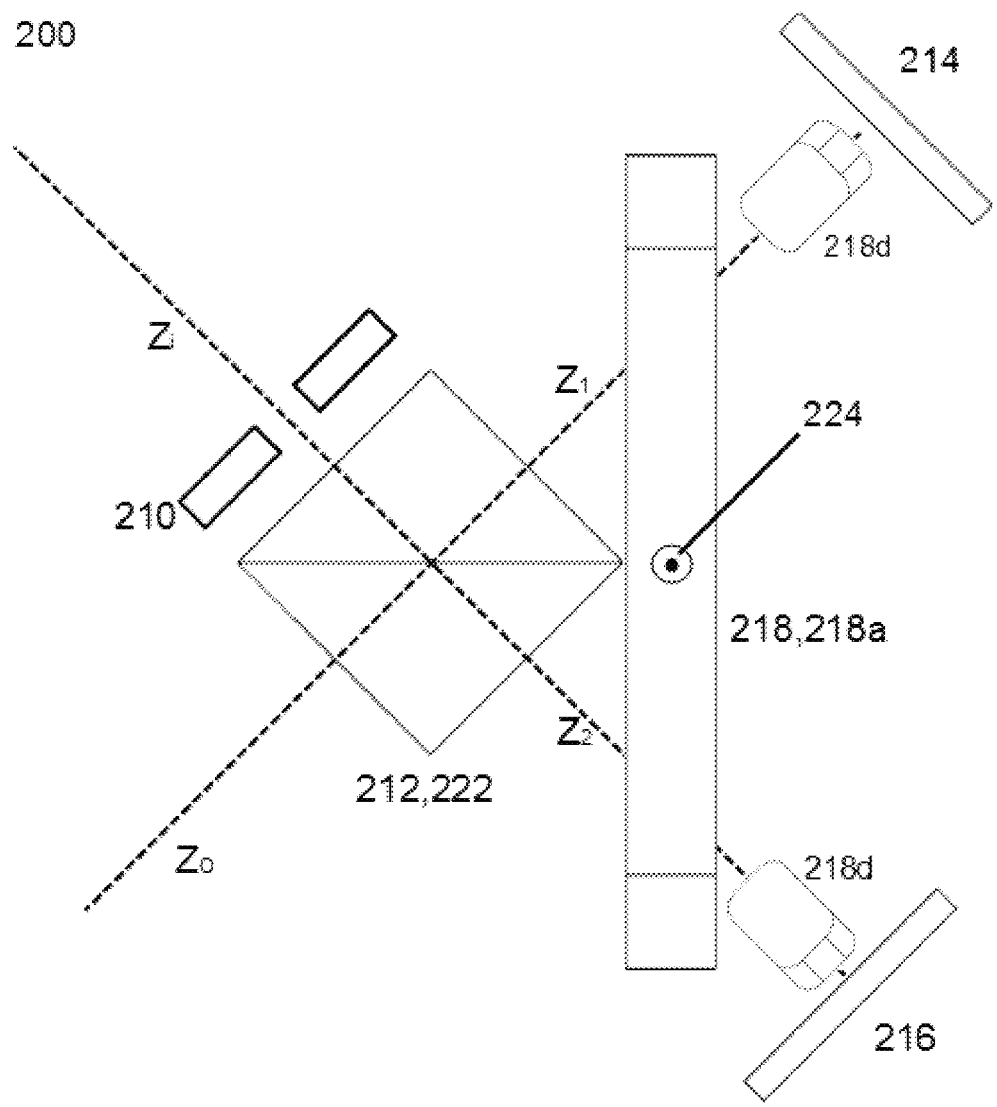
FIGS. 11 & 12 depict alternate dual-beam embodiments of the embodiments depicted in FIGS. 6 & 7.

In one further embodiment and with reference to FIG. 11, at least one of the X-axis pivotable refractor and Y-axis pivotable refractor may be a dual-beam pivotable refractor configured to refract both the first beam and the second beam. In FIG. 11, the X-axis pivotable refractor is depicted as a dual-beam pivotable refractor 218a, with separate Y-axis pivotable refractors 218d. In an alternate (but not mutually exclusive) further embodiment, at least one of the X-axis and Y-axis pivotable refractors may comprise a first and second pivotable refractor.

Figure 12:
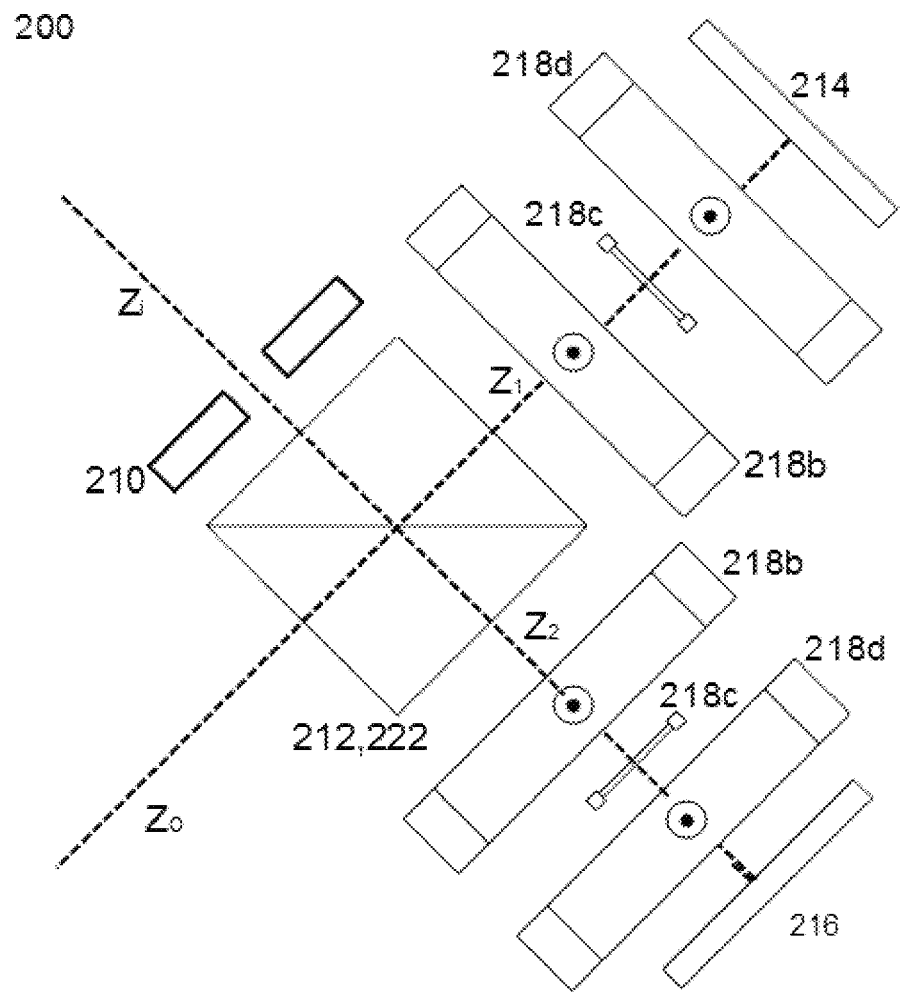

In one embodiment and with reference to FIG. 12, the X-axis and Y-axis pivotable refractors 218b,218d may not rotate about axes that are physically perpendicular to one another. In such an embodiment, the system 200 may utilise one or more light-rotating elements 218c interposed between the X-axis and Y-axis pivotable refractors in order to induce optical rotation, thereby ensuring that the axes of the sequential pivotable refractors are optically perpendicular to one another.

Example System—Dual-Beam Pivotable Refractor

Figure 13:
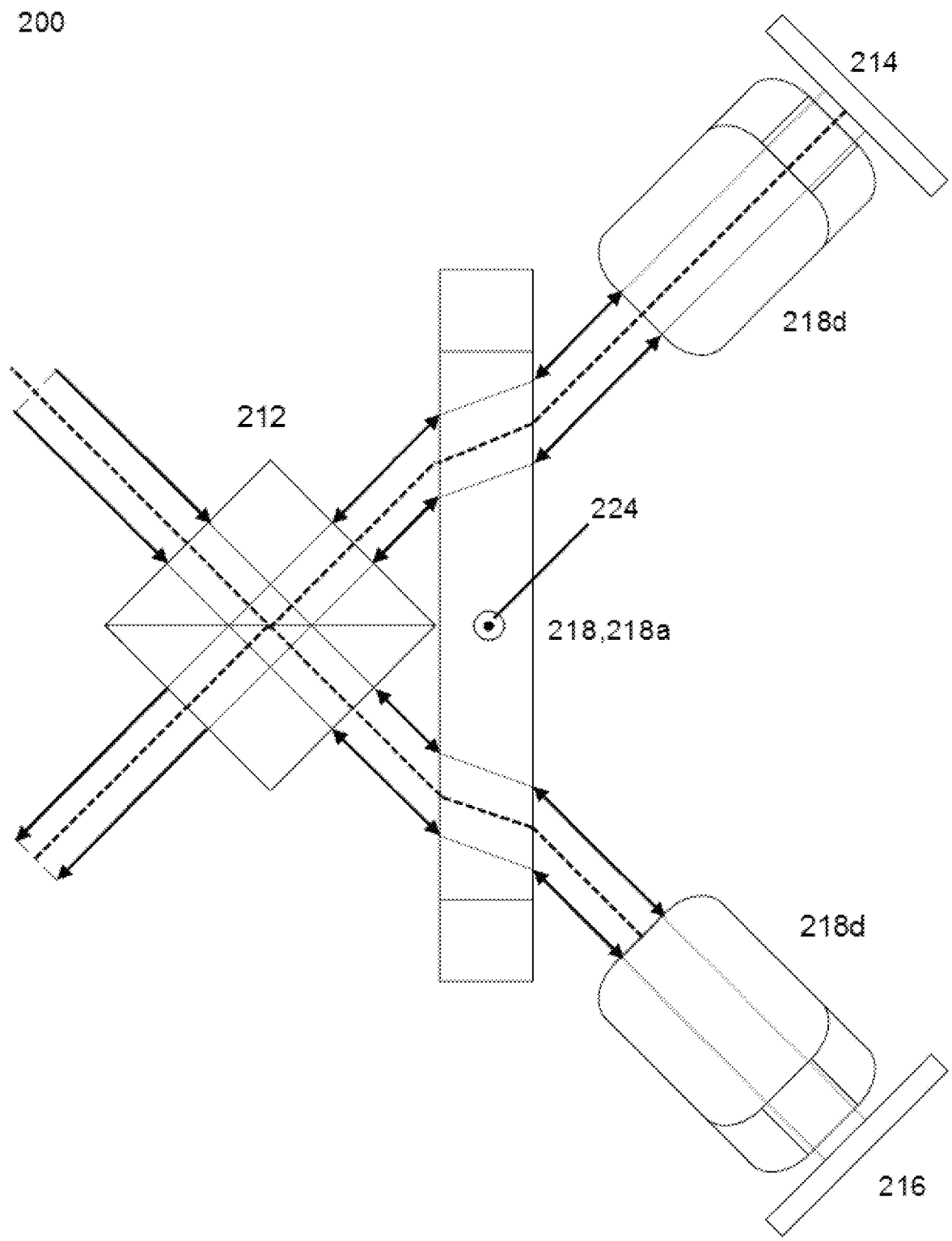
FIGS. 13-16 depict how light paths are altered by off-axis incident light.

In embodiments wherein both the first and second beams are refracted, the rOPD Assembly 218 may comprise a dual-beam pivotable refractor 218a that provides a single refractive element for both of the beams. FIG. 13 depicts an exemplary embodiment of such a system 200, that has been further modified to utilise the principles of multiple sequential refractors. The exemplary embodiment of FIG. 13 comprises a beam splitter 212, a refractive element 218a that can rotate about an axis through its geometric centre, two reflectors 214,216 aligned to precisely reflect collimated beams as shown, and two further Y-axis pivotable refractors 218d, each of the same thickness and material as the first main pivotable refractor 218a and such that the Y-axis pivotable refractors 218d rotate about axes lying in the plane of the figure and extending through their geometric centres. In FIG. 13, the dual-beam pivotable refractor 218a is angled to "zero angle" a, which is defined that at the "zero angle", the angle of incidence for the first beam is equal to the angle of incidence of the second beam, and the induced path difference $\Delta_d$ is zero. This may be contrasted against FIG. 14, which depicts the dual-beam pivotable refractor 218a rotated to angle cp. With reference to Equation 9, the angle used to calculate the path difference for each beam will be:

$$\theta_1 = \alpha + \varphi \ \& \ \theta_2 = \alpha - \varphi$$

Figure 14:
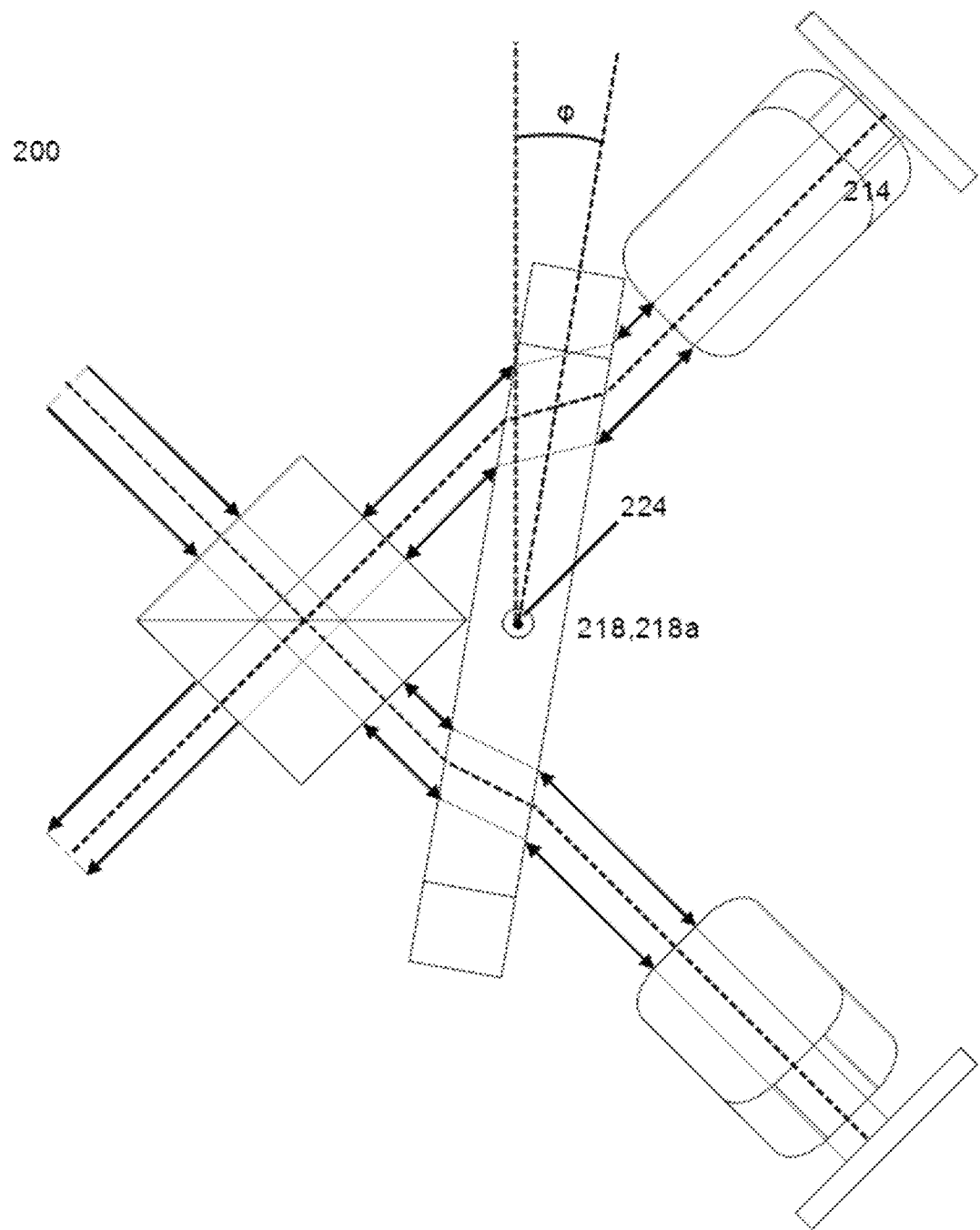

In the example shown, the "Zero angle" α is 45°, and between FIGS. 13 & 14 the pivotable dual-beam refractor 218a rotates such that φ is 10°, such that θ is 55°. At the same time, the angle between the pivotable dual-beam refractor and the second beam decreased from 45° by 20°, such that $\theta_2$ is 35°.

Figure 15:
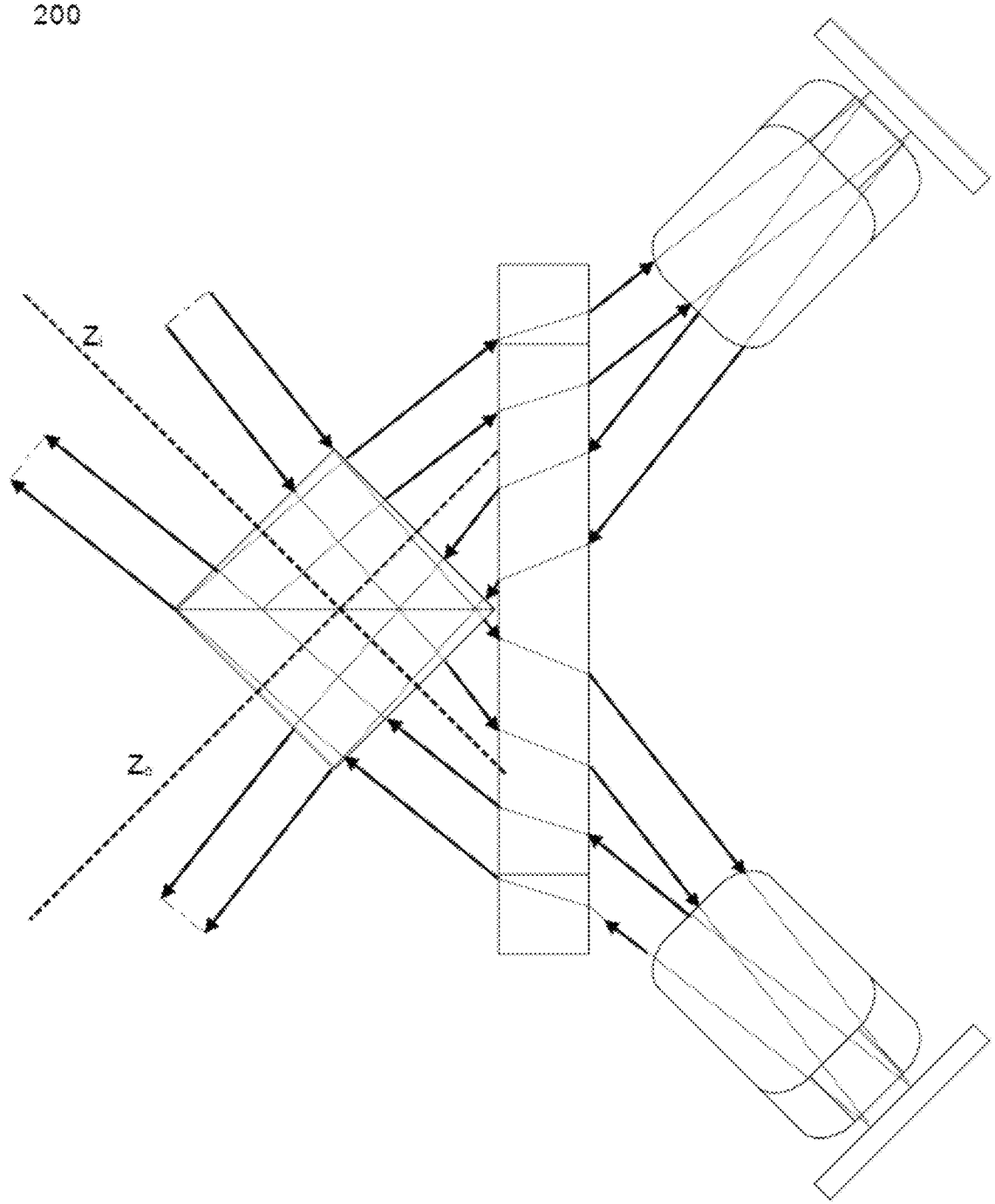
Figure 16:
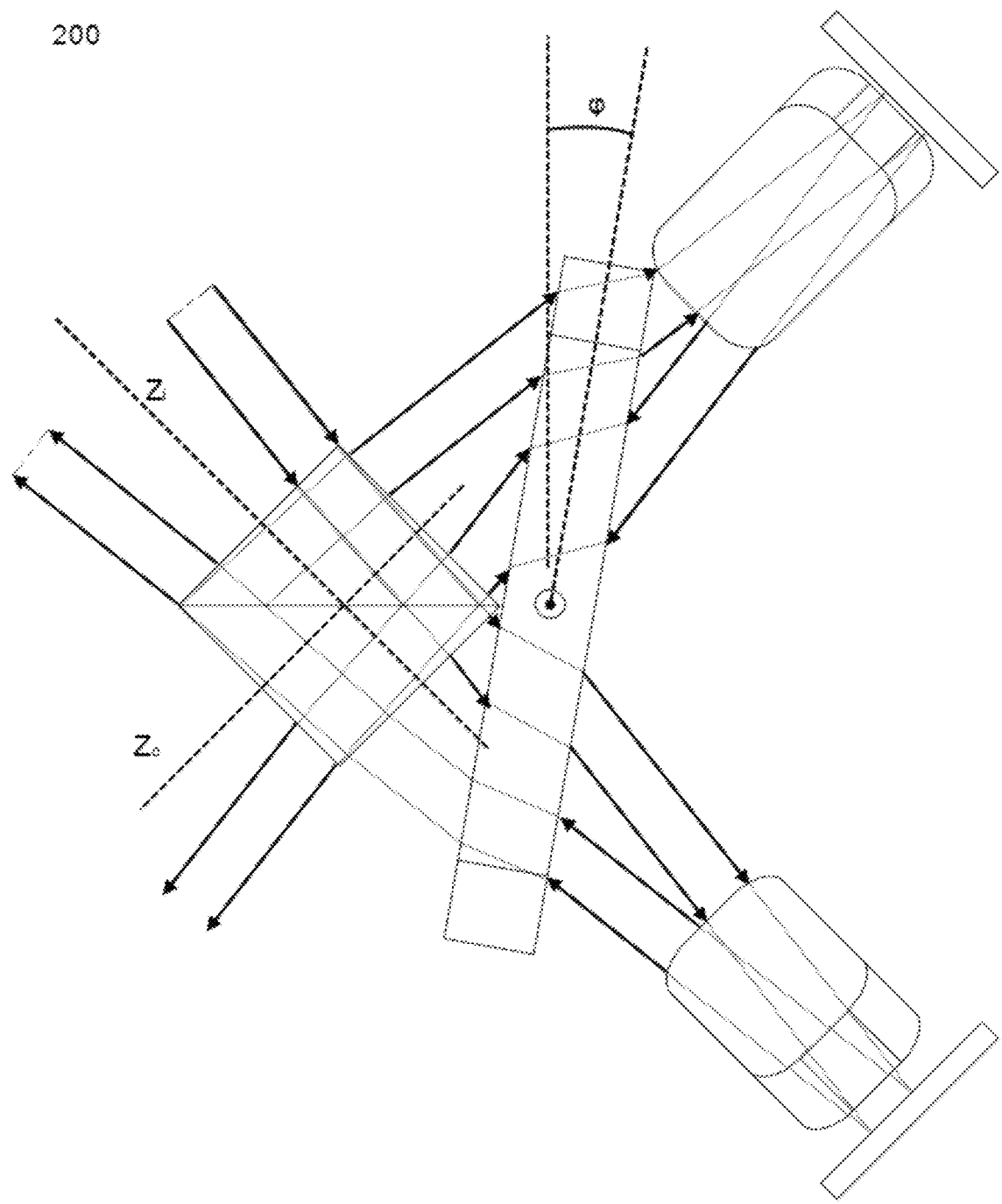

For comparison, FIGS. 15 and 16 depict the same arrangement as FIGS. 13 and 14, except the light beams are arriving at a non-zero receiving angle σ. As depicted, the non-zero receiving angle induces a substantial lateral shift in the output beam away from the output axis $Z_o$. There is also an additional difference in path length between the input beams of FIGS. 13 and 15 (or 14 and 16), due to the receiving angle σ.

Dual-Beam Pivotable Refractors—Variation

Figure 17:
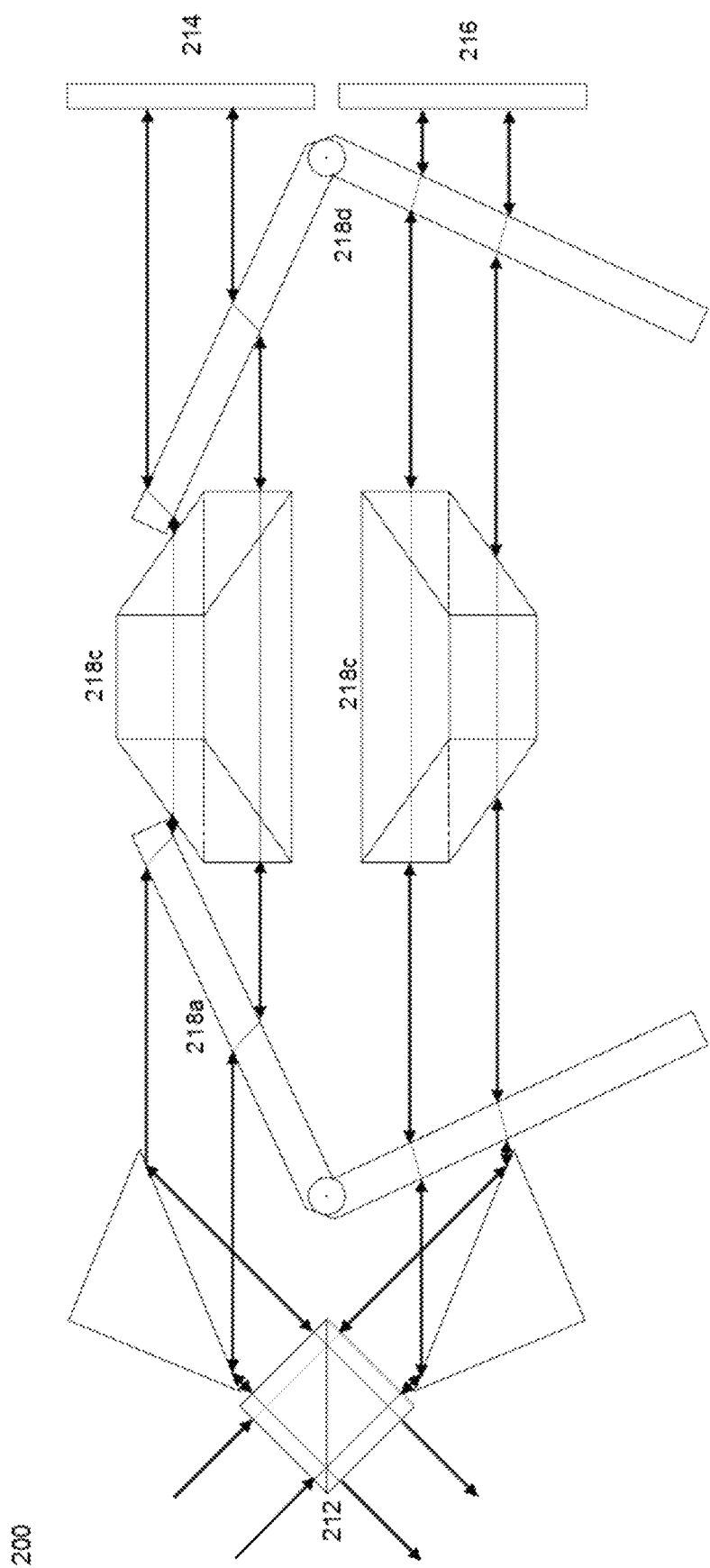
FIG. 17 depicts an alternate form of a dual-beam pivotable refractor.

It is not always necessary for the dual-beam pivotable refractor to be a substantially straight element. With reference to FIG. 17, there is depicted an arrangement of the system 200 that decreases a lateral size of the system 200 through the use of a bent dual-beam pivotable refractor 218a. In particular, the embodiment shown in FIG. 17 is an arrangement utilising multiple sequential pivotable refractors 218a, 218d, wherein both the X-axis and Y-axis pivotable refractors are dual-beam pivotable refractors. The system further comprises a first and second light-rotating element, as the pivot axes of the X-axis and Y-axis pivotable refractors are not physically perpendicular to one another, however the skilled person will appreciate that this is not always going to be the case, and that there may be embodiments wherein the pivot axes of the X-axis and Y-axis pivotable refractors are physically perpendicular to one another.

While the invention has been described with reference to preferred embodiments above, it will be appreciated by those skilled in the art that it is not limited to those embodiments, but may be embodied in many other forms, variations and modifications other than those specifically described. The invention includes all such variation and modifications. The invention also includes all of the steps, features, components and/or devices referred to or indicated in the specification, individually or collectively and any and all combinations or any two or more of the steps or features.

In this specification, unless the context clearly indicates otherwise, the word "comprising" is not intended to have the exclusive meaning of the word such as "consisting only of", but rather has the non-exclusive meaning, in the sense of "including at least". The same applies, with corresponding grammatical changes, to other forms of the word such as "comprise", etc.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Any promises made in the present document should be understood to relate to some embodiments of the invention, and are not intended to be promises made about the invention in all embodiments. Where there are promises that are deemed to apply to all embodiments of the invention, the applicant/patentee reserves the right to later delete them from the description and they do not rely on these promises for the acceptance or subsequent grant of a patent in any country.

The invention claimed is:

1. A scanning interferometric system comprising:
an aperture that receives an incident light beam at a receiving angle;
a beam splitter configured to split the incident light beam into a first beam and a second beam;

a first and a second reflector arranged to reflect the first beam and second beam, respectively, towards a combining optical element; and a refractive Optical Path Difference (rOPD) assembly interposed between the beam splitter and the first reflector;

wherein the rOPD Assembly comprises at least one pivotable refractor able to pivot about an axis extending substantially perpendicular to an optical Z axis of the first beam, said optical Z axis being an ideal direction of travel of the first beam;

said at least one pivotable refractor being arranged to refract the first beam, thereby inducing a difference in path length between the first and second beams, thereby phase-shifting the first beam relative to the second beam; and the combining optical element is configured to receive and combine the phase-shifted first beam and the second beam into an output beam having an interference pattern induced by the phase-shifted first beam and the second beam interfering with one another;

further wherein the interference pattern contains a phase discrepancy induced during refraction of the first light beam and having a magnitude dependent upon the receiving angle;

the aperture has a critical receiving angle, being a maximum value of the receiving angle, beyond which the induced phase discrepancy is of sufficient magnitude to render a produced interference pattern illegible, invisible or otherwise undetectable;

the rOPD assembly is arranged to refract the first beam by the at least one pivotable refractor an even number of times as it passes therethrough, said even number comprising an equal number of first refractions and second refractions, said first refractions being refractions along the optical X axis, said second refractions being refractions along the optical Y axis, and said optical X & Y axes being optically perpendicular to one another and to the optical Z axis of the first beam;

the phase discrepancy is a vector sum of a first phase discrepancy induced by a first refraction and a second phase discrepancy induced by a second refraction; and the rOPD Assembly is configured such that the first phase discrepancy is substantially opposite in direction to the second phase discrepancy, such that a portion of the first and second phase discrepancies cancel one another out, thereby decreasing magnitude of the phase discrepancy.

2. The system of claim 1, wherein the at least one pivotable refractor is a single pivotable refractor that refracts the first light beam for the even number of times, the single pivotable refractor adapted to refract the first light beam along the optical X or Y axis thereof; and The rOPD Assembly further comprises a light-rotating element arranged to rotate the first light beam by approximately 90° about the optical Z axis between successive refractions, thereby flipping the optical X and Y axes of the first light beam, such that the successive refractions alternate between being first and second refractions.

3. The system of claim 2 wherein the rOPD is further arranged to direct the first light beam through the light-rotating element an even number of times between successive refractions, each time rotating by approximately 45°.

4. The system of claim 2, wherein both the first beam and the second beam are refracted an even number of times by the rOPD Assembly;

the second beam has a further optical Z axis, said further optical Z axis being an ideal direction of travel of the second beam;

the single pivotable refractor of the rOPD Assembly is a dual-beam pivotable retractor that is configured to refract each of the first and second beams an even number of times, the dual-beam pivotable retractor having a pivot axis perpendicular to the optical Z axis and the further optical Z axis; and the light-rotating element is configured to rotate the first light beam by approximately 90° about the optical Z axis and the second light beam by approximately 90° about the further optical Z axis.

5. The system of claim 4, wherein the light-rotating element comprises:

a first light-rotating element arranged to rotate the first light beam by approximately 90° about the optical Z axis; and a second light-rotating element arranged to rotate the second light beam by approximately 90° about the further optical Z axis.

6. The system of claim 2, wherein both the first beam and the second beam are refracted an even number of times by the rOPD Assembly;

the system further comprises a second pivotable retractor arranged to refract the second light beam; and the light-rotating element is configured to rotate the first light beam by approximately 90° about the optical Z axis and the second light beam by approximately 90° about the further optical Z axis.

7. The system of claim 6, wherein the light-rotating element comprises:

a first light-rotating element arranged to rotate the first light beam by approximately 90° about the optical Z axis; and a second light-rotating element arranged to rotate the second light beam by approximately 90° about the further optical Z axis.

8. The system of claim 1, wherein the at least one pivotable refractor comprises:

an X-axis pivotable refractor that induces the first refractions in the first beam; and a Y-axis pivotable refractor that induces the second refractions in the first beam.

9. The system of claim 8, wherein the X-axis pivotable refractor and y-axis pivotable refractor have pivot axes that are not physically perpendicular to one another; and the rOPD Assembly further comprises a light-rotating element between the X-axis pivotable refractor and y-axis pivotable refractor that is arranged to rotate the first beam about the optical Z axis, such that the X-axis pivotable refractor and y-axis pivotable refractor are optically perpendicular to one another.

10. The system of claim 8, wherein both the first beam and the second beam are refracted an even number of times by the rOPD Assembly, and at least one of the X-axis pivotable refractor and Y-axis pivotable refractor is a dual-beam pivotable refractor that is configured to refract both the first beam and the second beam.

11. The system of claim 8, wherein both the first beam and the second beam are refracted an even number of times by the rOPD Assembly, and wherein either:

the X-axis pivotable refractor comprises a first X-axis pivotable refractor positioned to refract the first beam, and a second X-axis pivotable refractor positioned to refract the second beam;

the Y-axis pivotable refractor comprises a first Y-axis pivotable refractor positioned to refract the first beam, and a second Y-axis pivotable refractor positioned to refract the second beam; or the X-axis pivotable refractor comprises a first and second X-axis pivotable refractor, and the Y-axis pivotable refractor comprises a first and second Y-axis pivotable refractor.

12. The system of claim 1, wherein both the first beam and the second beam are refracted an even number of times by the rOPD Assembly.

13. The system of claim 1, wherein the combining optical element is the beam splitter, such that the system is a Michelson-type interferometric system.

* * * * *